Jan. 8, 1924.

A. C. EEK 1,479,793

MACHINE FOR INSERTING FASTENINGS

Filed Nov. 15, 1920

INVENTOR
Albin C. Eek
By his Attorney,
Nelson W. Howard

Patented Jan. 8, 1924.

1,479,793

UNITED STATES PATENT OFFICE.

ALBIN C. EEK, OF WEBSTER GROVES, MISSOURI, ASSIGNOR TO UNITED SHOE MACHINERY CORPORATION, OF PATERSON, NEW JERSEY, A CORPORATION OF NEW JERSEY.

MACHINE FOR INSERTING FASTENINGS.

Application filed November 15, 1920. Serial No. 424,242.

*To all whom it may concern:*

Be it known that I, ALBIN C. EEK, a citizen of the United States, residing in Webster Groves, in the county of St. Louis and State of Missouri, have invented certain Improvements in Machines for Inserting Fastenings, of which the following description, in connection with the accompanying drawings, is a specification, like reference characters on the drawings indicating like parts in the several figures.

This invention relates to machines for inserting fastenings, and is herein shown as embodied in a machine especially adapted to insert headed tacks of the kinds used in the manufacture of boots and shoes and the various parts thereof. Machines of this type usually comprise fastener feeding mechanism, a fastener positioning device, and fastener driving means.

An object of the invention is to provide an improved fastener positioning device for a machine for inserting fastenings, the illustrated device being particularly designed for use in driving tacks through perforations in metal reinforcing strips to secure them to shank pieces for shoes.

Shank pieces for use in the manufacture of shoes, which are reinforced by a strip of metal, have come into general use. The metal reinforcement is previously formed, and may be provided with perforations through which fasteners such as tacks are driven to secure the reinforcement to the shank piece. It is somewhat difficult with tack driving means as usually constructed to position the shank piece and metal reinforcement properly below the tack positioning device in such manner that the points of the tacks will accurately penetrate the perforation in the metal reinforcement. For this reason such work has usually been done by hand.

A particular object of the present invention is to provide an improved tack positioning device or nozzle for a machine of this character which will co-operate with the perforations in such metal reinforcing strips to position them accurately with relation to the tacks to be driven therethrough.

A further object of the invention is to provide such a device which will not stick or bind in these perforations.

Figure 1:
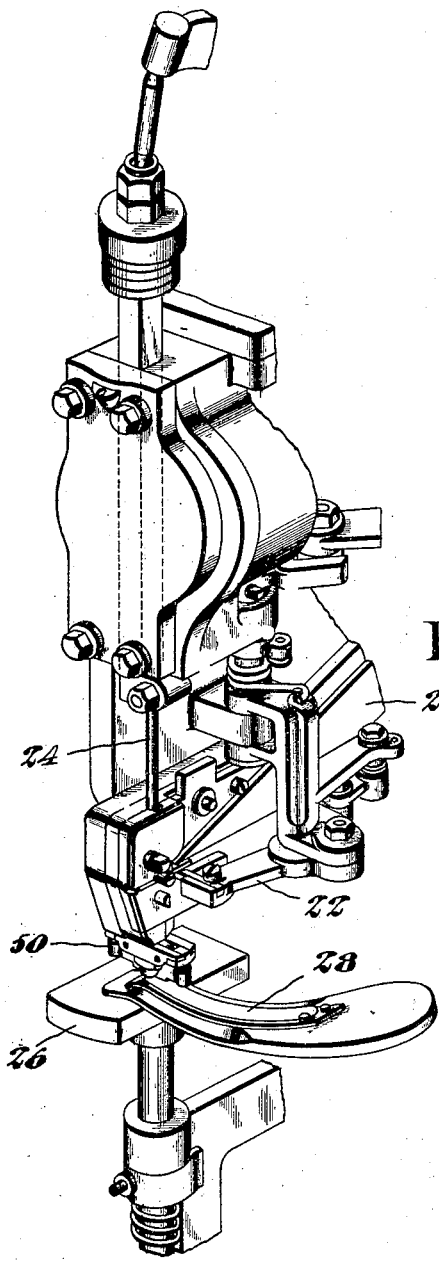
Fig. 1 is a perspective view of so much of a tack driving machine as is necessary to illustrate this invention.
Figure 2:
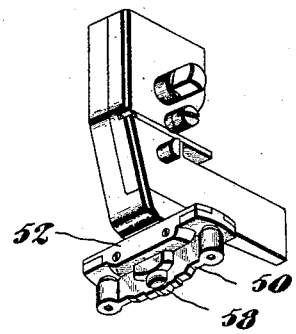
Fig. 2 is an enlarged perspective view showing the tack positioning device or nozzle.
Figure 3:
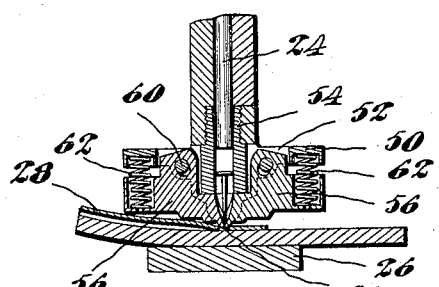
Fig. 3 is a section through the tack positioning device or nozzle.

For convenience of illustration the present invention is shown as embodied in a machine of the kind disclosed in Patents Nos. 1,106,393 and 1,312,598, issued on applications filed respectively by Fred L. Mackenzie and Frank H. Warren. This machine, as illustrated herein and as shown in the above cited patents, comprises a raceway 20 down which headed tacks are conducted from a suitable source of supply; a separator 22 which separates the foremost tack in the raceway from those behind it and feeds it into the tack positioning device; and a tack driving plunger 24 which is reciprocated by suitable mechanism disclosed in detail in the above cited patents.

In using this machine for driving tacks into shank pieces, I provide a suitable table or support 26 on which a shank piece may be placed and which is raised and lowered by suitable treadle mechanism not shown.

There is provided an improved tack positioning device or nozzle indicated generally at 50. This device comprises a fixed part or throat member 52 which extends upwardly in the form of a threaded stem 54, which is preferably interchangeable with the stem of the tack positioning device or nozzle used in these machines as illustrated in the above cited patents. Mounted in this fixed part 52 are two jaws 56, the contacting parts of which project downward as illustrated at 58 to form a guide projection which enters a perforation in the metal reinforcement 28 to center the perforation accurately below a tack in the nozzle. It will be noted that the inner surface of these jaws is curved in such a manner as to support the point of a tack.

If these jaws were mounted on fixed pivots they might, on opening to allow the driving of a tack, bind or stick in the perforation. To obviate this possibility, I provide a pin and slot mounting 60 and springs 62 bearing against the outer ends of the jaws. By this mounting, as the point of the tack passes between the jaws to enter the perforation, the jaws turn about the points of contact with the springs, as fulcrums, until the lower edges of the slots contact with the fixed pivots. This arcuate motion in an upward direction is sufficient to withdraw the projections 58 from the perforations in the metal reinforcement 28. Thereafter as the plunger 24 drives the tack between the jaws, the head of the tack cams against the inner surface of the jaws, swinging them outwardly upon the pivots 60 as fulcrums, and compressing the springs 62, thereby allowing the head of the tack to pass between the jaws. During this outward swinging movement the projections 58 slide easily over the surface of the metal reinforcement 28.

While I have illustrated and described my invention as embodied in a machine of the class disclosed in the above cited patents, it will be obvious that in certain of its features it is capable of more general application, and it is not intended to limit its scope thereby. Such broad scope of the invention is intended to be embraced within the terms of the appended claims.

Having described my invention, what I claim as new and desire to secure by Letters Patent of the United States is:

1. In a machine of the class described, a driving plunger, a work support, and a device comprising jaws constructed and arranged to position a fastening below said plunger and to position work bodily upon said support to determine the point of application of the fastening to the work.

2. In a machine for driving tacks through perforations in articles, driving means, an article support and a device constructed and arranged to co-operate with perforations in articles on the support to guide the points of tacks through the perforations and to be removed from co-operative relation with the perforations while the tacks are being driven.

3. In a machine for driving tacks through perforations in articles, tack-driving means, and a device constructed to enter perforations and to guide the points of tacks therethrough, and arranged to be forced out of said perforations by the driving of said tacks.

4. In a machine for use in fastening perforated metal shank stiffeners to shank pieces, means for driving a tack through a perforation in a shank stiffener, and a nozzle for guiding the tack having means for entering said perforation, said means being displaceable from said perforation by the tack being driven therein.

5. A nozzle for a tack-driving machine, for use in driving tacks through perforated articles, said nozzle having projections to enter perforations in the articles, to center them below tacks in the nozzle, and being so constructed and arranged that the projections are withdrawn from the perforations as the tacks are driven.

6. In a machine for operating on perforated articles and comprising a tack-driving plunger and tack-feeding means, a device to receive tacks from said means and position them below said plunger, said device having projections arranged to enter the perforations in said articles to center said perforations below the tacks to be driven therethrough and said device being constructed and arranged to permit the withdrawal of said projections from said perforations during the tack-driving operation.

7. In a machine for operating on perforated articles and comprising a tack-driving plunger and tack-feeding means, a device to receive tacks from said means and position them below said plunger, said device having projections to enter the perforations to center them below tacks to be driven therethrough and being constructed and arranged so that the tack being driven will act to eject said projections from said perforations.

8. In a machine for operating on perforated articles and comprising a tack-driving plunger and tack-feeding means, a device to receive tacks from said means and position them below said plunger, said device having projections to enter the perforations to center them below tacks to be driven therethrough, and being constructed and arranged to withdraw the projections as the tacks are driven.

9. A nozzle for a fastener-inserting machine, said nozzle being constructed and arranged to center a hole in a piece of material through which a fastener is to be inserted, below a fastener in said nozzle, and to open to allow the insertion of the fastener without binding against the material.

10. In a tack-driving machine, a nozzle comprising jaws having work-gaging means and mounted to yield upwardly as a tack is driven to withdraw said means from the work.

11. In a tack-driving machine, a nozzle comprising jaws having work-gaging means and mounted to yield upwardly as a tack is driven to withdraw said means from the work, and to swing outwardly to allow the head of the tack to pass through the jaws.

12. In a machine for inserting fasteners, a fastener-positioning nozzle comprising a fastener guiding portion having bearings thereon and jaws mounted in said bearings, said jaws being constructed and arranged to have sliding and turning movement with respect to said bearings.

13. In a machine for inserting fasteners, a fastener positioning nozzle comprising a fastener guiding portion having bearings thereon, jaws mounted in said bearings, said jaws being constructed and arranged to have sliding and turning movement with respect to said bearings, and yielding means opposing said turning movement.

14. In a machine for driving tacks through perforations in articles, a tack-positioning device comprising jaws having projections to extend into perforations, said jaws being constructed and arranged to yield in an upward direction as the tacks are driven, to withdraw the projections from the perforations.

15. In a machine for driving tacks through perforations in articles, a tack-positioning device comprising jaws having projections to extend into perforations, said jaws being constructed and arranged to yield in an upward direction as the tacks are driven, to withdraw the projections from the perforations, and to open to allow the heads of the tacks to pass between them.

16. A nozzle for a fastener-inserting machine, comprising a fixed part and jaws fulcrumed thereon by a pin-and-slot connection, whereby the jaws may move upwardly as fasteners are inserted.

17. A nozzle for a tack-driving machine, comprising a fixed part and jaws fulcrumed thereon by a pin-and-slot connection, whereby the jaws may move upwardly as tacks are driven, and also swing apart to allow the heads of the tacks to pass therethrough.

18. A nozzle for a tack-driving machine, comprising a fixed part and jaws fulcrumed thereon by a pin-and-slot connection, whereby the jaws may move upwardly as tacks are driven, and also swing apart to allow the heads of the tacks to pass therethrough, in combination with yielding means constantly urging said jaws to closed position.

19. A nozzle for a fastener-inserting machine, comprising a fixed part and jaws mounted thereon by a pin-and-slot connection, whereby the jaws may move upwardly as fasteners are inserted, the contacting parts of said jaws being extended to form guiding projections.

20. A nozzle for a fastener-inserting machine, comprising jaws, said jaws being so constructed and arranged that during the effective operation of the fastener-inserting means the contacting parts have a total motion compounded of a plurality of arcuate motions.

21. A nozzle for a fastener-inserting machine comprising jaws, each of said jaws being constructed and arranged to move about a plurality of fulcrums while the fastener is being inserted.

22. A nozzle for a tack-driving machine comprising fixed parts, jaws, and yielding means bearing against said jaws, said nozzle being so constructed and arranged that when the jaws are opened by the driving of a tack, said jaws will open about the points of contact with the yielding means, as fulcrums, until stopped by said fixed parts, and thereafter about the points of contact with the fixed parts, as fulcrums, compressing said yielding means.

23. A nozzle for a tack-driving machine, comprising a throat member having a passageway for the tacks and the tack driver, a pair of jaws pivotally mounted at opposite sides of said throat member and yieldingly pressed toward each other to engage and guide the shank of a tack driven between them, and a projection on one of said jaws for entering a perforation in a piece of work to position the work relatively to the tack to be driven therein.

24. A nozzle for a tack-driving machine, comprising a throat member having a passageway for the tacks and the tack driver, a pair of jaws yieldingly pressed toward each other to engage and guide the shank of a tack driven between them, said jaws being pivotally mounted at opposite sides of said throat member with provision for limited displacement of the jaws with respect to their pivotal axes, the tack-engaging portions of said jaws being in the form of projections shaped to enter a hole in the work prior to the tack-driving operation to position the hole for the reception of the tack, and springs for holding said jaws in normal non-displaced position wherein said projections are maintained in co-operative relation to perform their work-positioning function and to engage and guide the shank of a tack to be driven.

In testimony whereof I have signed my name to this specification.

ALBIN C. EEK.